US008917685B2

(12) United States Patent
Villardi et al.

(10) Patent No.: US 8,917,685 B2
(45) Date of Patent: Dec. 23, 2014

(54) WIRELESS COMMUNICATION SYSTEM, CLUSTER HEAD EQUIPMENT (CHE) INSTALLED IN WIRELESS COMMUNICATION SYSTEM, AND WIRELESS COMMUNICATION METHOD

(75) Inventors: Gabriel Porto Villardi, Koganei (JP); Chen Sun, Koganei (JP); Yohannes Alemseged Demessie, Koganei (JP); Ha Nguyen Tran, Koganei (JP); Hiroshi Harada, Koganei (JP)

(73) Assignee: National Institute Of Information And Communications Technology, Tokyo (JP)

( * ) Notice: Subject to any disclaimer, the term of this patent is extended or adjusted under 35 U.S.C. 154(b) by 211 days.

(21) Appl. No.: 13/635,437

(22) PCT Filed: Mar. 15, 2011

(86) PCT No.: PCT/JP2011/001514
§ 371 (c)(1),
(2), (4) Date: Oct. 15, 2012

(87) PCT Pub. No.: WO2011/114717
PCT Pub. Date: Sep. 22, 2011

(65) Prior Publication Data
US 2013/0064237 A1    Mar. 14, 2013

(30) Foreign Application Priority Data
Mar. 17, 2010    (JP) .................................. 2010-060187

(51) Int. Cl.
| H04W 4/00 | (2009.01) |
| H04W 16/14 | (2009.01) |
| H04W 28/04 | (2009.01) |
| H04B 7/212 | (2006.01) |

(52) U.S. Cl.
CPC ............ *H04W 16/14* (2013.01); *H04W 28/048* (2013.01)
USPC .......................................... 370/329; 370/348

(58) Field of Classification Search
None
See application file for complete search history.

(56) References Cited

U.S. PATENT DOCUMENTS

| 8,155,649 B2* | 4/2012 | McHenry et al. ............. 455/434 |
| 8,326,313 B2* | 12/2012 | McHenry et al. ............. 455/454 |
| 2007/0253394 A1 | 11/2007 | Horiguchi et al. | |

FOREIGN PATENT DOCUMENTS

| GB | 2457432 A | 8/2009 |
| JP | 2007-300419 A | 11/2007 |
| JP | 2009-177816 A | 8/2009 |

OTHER PUBLICATIONS

Examination Report of GB patent application No. GB1218177.2 dated Apr. 22, 2014 (1 page).
International Search Report for PCT/JP2011/001514 from the Japanese Patent Office completed on Jun. 8, 2011 and mailed Jun. 21, 2011 (2 pages).
Digital dividend : Geolocation for cognitive access (Ofcom), Nov. 17, 2009.

* cited by examiner

*Primary Examiner* — Eunsook Cho
(74) *Attorney, Agent, or Firm* — Pyprus Pte Ltd

(57) ABSTRACT

Disclosed is a wireless communication system and the like that can avoid interference even if a plurality of networks coexist. The wireless communication system includes a primary user, cluster head equipment, and a secondary user. The cluster head equipment is for providing a local area network to a cluster region containing the abovementioned primary user. Also, the cluster head equipment contains: an acquisition means that acquires one or both—of information regarding the primary user and information regarding a primary signal—and the like; and a transmission means that transmits information to the secondary user. Then, using this wireless communication system, the secondary user performs cognitive wireless communication or the like on the basis of the information received from the transmission means of the cluster head equipment.

13 Claims, 6 Drawing Sheets

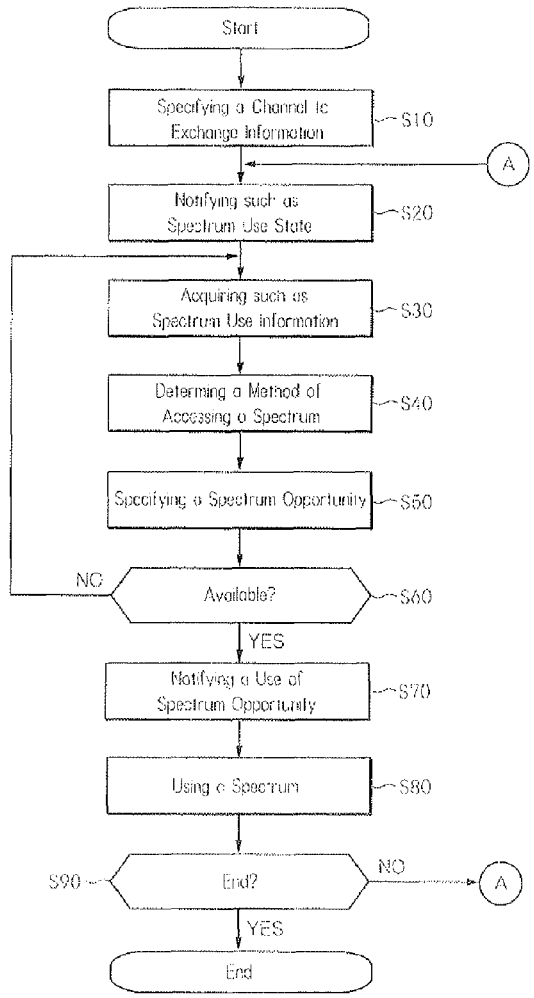

WIRELESS COMMUNICATION SYSTEM, CLUSTER HEAD EQUIPMENT (CHE) INSTALLED IN WIRELESS COMMUNICATION SYSTEM, AND WIRELESS COMMUNICATION METHOD

TECHNICAL FIELD

The present invention relates to a wireless communication system, a cluster head equipment (CHE) installed in the wireless communication system, and a wireless communication method, and more particularly, to a wireless communication system performing cognitive wireless communication using a cognitive wireless communication terminal which is a secondary user, a cluster head equipment (CHE) installed in the wireless communication system, and a wireless communication method of performing cognitive communication in the wireless communication system.

BACKGROUND ART

According to Federal Communications Commission (FCC), wireless communication performed using a frequency band for televisions is considered to be realized by a cognitive wireless communication terminal as a secondary user. Specifically, the cognitive wireless communication terminal is considered to be realized after the cognitive wireless communication terminal confirms that a white space is present (that is, no signal is present in operation). As a signal in operation, a primary signal such as a digital terrestrial television signal (DTT signal) can be exemplified.

Accordingly, when the cognitive wireless communication is performed, it is at least necessary to confirm that no primary signal is present in a predetermined space, time, or frequency band.

As technologies for confirming whether a primary signal is present, three technologies, that is, a technology relevant to a database (for example, a database for a television white space), a technology relevant to sensing, and a technology relevant to a cognitive pilot channel (CPC) can be mainly exemplified (for example, see Non-Patent Literature 1). Moreover, a cognitive wireless communication terminal as a secondary user can perform communication using the spectrum of an available frequency by confirming that no primary signal is present.

An object of the above-described technology is to prevent an unlicensed cognitive wireless communication terminal as a secondary user from generating interference, which may have an adverse influence, with respect to a licensed primary user. Avoidance of the interference is required not only for the communication performed using a television white space but also for communication performed using a white space.

Further, there is the following problem as the more recent problem with the television white space. When various cognitive wireless communication terminals (secondary users) are present within a certain area, a plurality of wireless networks are formed within the area in some cases. That is, the plurality of wireless networks coexist within the predetermined area. In this case, it is necessary to avoid the interference between the cognitive wireless communication terminals as well.

Therefore, a coexistent database (sensing database) is considered to be provided to avoid the interference when the plurality of wireless networks coexist. The coexistent database stores information regarding the secondary users. In this case, each user can understand the states of the networks by accessing the coexistent database. Moreover, each user can determine an operation to avoid the interference in accordance with the state of the network which the user understands.

However, when each user accesses the coexistent database, it takes that time (that is, delay occurs). Accordingly, a method different from the method of providing the coexistent database needs to be provided to avoid the interference between the networks. Moreover, when this method can be realized, the plurality of wireless networks can coexist without delay.

CITATION LIST

Non-Patent Literature

Non-Patent Literature 1: "Digital dividend: Geolocation for cognitive access", Ofcom, Nov. 17, 2009

SUMMARY OF INVENTION

Technical Problem

Accordingly, a primary object of the invention is to provide a wireless communication system and a wireless communication method capable of avoiding interference, even when a plurality of networks coexist.

Moreover, a secondary object of the invention is to provide a communication system and a wireless communication method capable of easily acquiring information necessary to avoid the interference without access to a coexistent database.

The other objects of the invention become apparent throughout the specification. For example, objects of the invention are to shorten the time necessary for sensing a primary signal in the wireless communication system to achieve efficiency and to efficiently perform wireless access of a secondary user. Moreover, an object of the invention is to provide a cluster head equipment (CHE) that can be installed in the conventional wireless communication system or the like.

Solution to Problem

According to a first aspect of the invention, a wireless communication system is provided. The wireless communication system is configured to enable cognitive wireless communication to be performed.

The wireless communication system includes a primary user, a cluster head equipment (CHE), and a secondary user. The cluster head equipment (CHE) is an equipment that provides a local area network (LAN) to a predetermined region (hereinafter, referred to as a cluster region). Here, the cluster region is a region including the primary user. Moreover, the secondary user is present within the cluster region.

The cluster head equipment (CHE) includes an acquiring unit and a transmitting unit. Here, the acquiring unit is a unit that acquires one or both of information regarding the primary user and information regarding the primary signal. In addition, the acquiring unit is able to acquire information regarding the secondary user. The transmitting unit is a unit that transmits information to the secondary user.

Based on the information received from the transmitting unit of the cluster head equipment (CHE), the secondary user is configured to perform the cognitive wireless communication with another secondary user or performs the cognitive wireless communication with the cluster head equipment (CHE) to access a communication line via the cluster head equipment (CHE). Here, an example of the communication line is the Internet.

As described above, since the cluster head equipment (CHE) is provided, a database which is a coexistent database is not necessary. Further, at least interference with the primary user can be avoided by acquiring the information regarding the primary user or the information regarding the primary signal. Furthermore, sensing the primary signal may not be performed or sensing the primary signal can be simplified.

According to the preferred aspect of the invention, the cluster head equipment (CHE) may further include a generating unit. The generating unit is a unit that generates control information used to control the secondary user based on the information acquired by the acquiring unit. Specifically, the cluster head equipment (CHE) processes the information acquired by the acquiring unit, and then generates information used to control the communication performed by the secondary user as the control information. An example of the control information includes information regarding a channel to be used by the secondary user and information regarding how to access a spectrum. In this case, the transmitting unit of the cluster head equipment (CHE) transmits the control information to the secondary user. Thus, the secondary user is able to perform the communication only based on the control information. Further, when the secondary user has a capability of processing the information acquired by the acquiring unit of the cluster head equipment (CHE), the above-described generating unit may not be included in the cluster head equipment (CHE).

According to the preferred aspect of the invention, the acquiring unit of the cluster head equipment (CHE) may acquire the information regarding the primary user by identifying whether the primary user is turned off. In this case, the secondary user receives information indicating that the primary user is turned off from the cluster head equipment (CHE). In this case, the secondary user may perform the cognitive wireless communication using a frequency band made available by the primary user. Accordingly, for example, when the primary user is turned off, the secondary user does not interfere with the primary user, and thus is able to perform the cognitive wireless communication using all of the frequency bands. Moreover, the cluster head equipment (CHE) does not need to perform sensing the primary signal, when the primary user is turned off.

According to the preferred aspect of the invention, the acquiring unit of the cluster head equipment (CHE) may acquire the information regarding the primary user by identifying whether the primary user uses a predetermined channel. In this case, the secondary user receives, from the cluster head equipment (CHE), information indicating that the primary user uses the predetermined channel or information regarding a channel which the primary user does not use. The secondary user may perform the cognitive wireless communication using a channel different from the channel used by the primary user. Accordingly, the cluster head equipment (CHE) does not need to perform sensing the primary signal for the channel used by the primary user.

According to the preferred aspect of the invention, the acquiring unit of the cluster head equipment (CHE) may acquire the information regarding the primary signal by performing sensing the primary signal or based on sensing information indicating a sensing result of another device. Moreover, the acquiring unit is also able to acquire sensing information by accessing a predetermined storage unit (a memory of the cluster head equipment (CHE) or a database in the wireless communication system). In this case, the secondary user receives, from the cluster head equipment (CHE), information regarding a channel (vacant channel) determined in advance not to be used by the primary user among a plurality of channels corresponding to the primary signal. Then, the secondary user may perform the cognitive wireless communication using the vacant channel. Accordingly, when the cluster head equipment (CHE) is able to acquire the information regarding the vacant channel determined in advance not to be used by the primary user through the sensing or the like, it is not necessary to further perform the sensing (scanning a frequency band) or access the coexistent database.

According to the preferred aspect of the invention, the wireless communication system may further include a second cluster head equipment (CHE) that is installed in a cluster region different from the cluster region. In this case, the cluster head equipment (CHE) and the second cluster head equipment (CHE) are configured to perform information exchange. When the information exchange is performed, information regarding the secondary user within the different cluster region is also acquired. In this way, it is not necessary to access the coexistent database. For example, by using the information obtained through the information exchange, the local area network (LAN) provided by the cluster head equipment (CHE) and the local area network (LAN) provided by the second cluster head equipment (CHE) can be configured not to interfere with each other.

According to the preferred aspect of the invention, the cluster head equipment (CHE) may perform information exchange with a third cluster head equipment (CHE) via the second cluster head equipment (CHE). When the information exchange is performed, information regarding the secondary user belonging to the local area network (LAN) provided by the third cluster head equipment (CHE) is also acquired. Thus, information regarding the cluster head equipment (CHE) located remotely can be acquired in a relay manner or the information regarding the cluster head equipment (CHE) for which the cluster region overlaps can be acquired. As a result, it is possible to perform control such that there is no interference to the network provided by the third cluster head equipment (CHE) and there is no interference from the network.

According to the preferred aspect of the invention, the cluster head equipment (CHE) and the second cluster head equipment (CHE) may perform information exchange using a dedicated control channel. Further, the dedicated control channel may be a channel (for example, a channel dedicated for beacon transmission) for wireless communication or may be a channel for wired communication. Thus, it is possible to prevent the interference to the primary user when the information exchange is performed.

According to the preferred aspect of the invention, the acquiring unit of the cluster head equipment (CHE) may specify a frequency band available to the secondary user based on the information obtained through the information exchange. In this case, the transmitting unit of the cluster head equipment (CHE) may transmit the information specified by the acquiring unit to the secondary user. More preferably, the acquiring unit of the cluster head equipment (CHE) specifies the frequency available to the secondary user and generates control information used to control the secondary user. An example of the control information includes information for performing power control such that the transmission output of the secondary user has a small value, when a specific frequency band specified to the secondary user present within each cluster region is used (without change). By using the control information, the interference can be prevented.

Another example of the control information includes information for causing a time slot used for the secondary user located within one cluster region to perform communication to differ from a time slot used for the secondary user located within the different cluster region to perform the communication when the secondary user located within each cluster region uses a specific frequency band (without change). More preferably, the control is performed such that the time slots are alternated.

The number of local area networks (LAN) is not limited to two, but three or more local area networks may be used. Thus, when the plurality of cluster head equipments (CHE) perform the information exchange, it is possible to prevent the plurality of local area networks (LAN) from interfering with each other.

According to the preferred aspect of the invention, the cluster head equipment (CHE) is overlapped by a remote area network (RAN) including the cluster region. In this case, the cluster head equipment (CHE) may further include a second acquiring unit that acquires one or both of information regarding a user belonging to the regional area network (RAN) or information regarding a signal supplied to the regional area network (RAN). Further, the transmitting unit of the cluster head equipment (CHE) is configured to transmit the information acquired by the second acquiring unit to the secondary user as well. Thus, even when a user (another secondary user) belonging to the regional area network (RAN) is also present within the cluster region, it is possible to avoid the interference to the regional area network (RAN) as well.

According to the preferred aspect of the invention, the cluster head equipment (CHE) is mounted in the primary user. For example, the cluster head equipment (CHE) may be mounted in a chip for the primary user. Alternatively, the cluster head equipment (CHE) may be connected to the primary user in a wired manner. In this way, the above-described wireless communication system can be easily configured. Moreover, the cluster head equipment (CHE) may not be mounted on the primary user. In this case, the cluster head equipment (CHE) is preferably connected to the primary user in a wireless manner.

According to the preferred aspect of the invention, the secondary user may include a determining unit and a transmitting unit. Here, the determining unit of the secondary user is a unit that determines whether the secondary user is present within an interference area. The interference area refers to an area in which the local area network (LAN) provided by the cluster head equipment (CHE) interferes with the local area network (LAN) provided by the second cluster head equipment (CHE). The transmitting unit of the secondary user is a unit that transmits, to the cluster head equipment (CHE), information indicating that the secondary user is present within the interference area, when the secondary user is present within the interference area as the determination result of the determining unit. In this case, the cluster head equipment (CHE) may include a control unit. The control unit is a unit that controls the secondary user based on the information received from the transmitting unit of the secondary user. Examples of the control include limiting or changing the range of a frequency or a channel available to the secondary user and decreasing the transmission output power. By performing this control, it is possible to reliably prevent the interference.

According to a second aspect of the invention, a cluster head equipment (CHE) is provided. The cluster head equipment (CHE) is installed in the conventional wireless communication system or the like and configures the wireless communication system according to the above-described first aspect of the invention. That is, when the cluster head equipment (CHE) is used, the wireless communication system according to the above-described first aspect of the invention can be configured.

According to a third aspect of the invention, a wireless communication method is provided. The wireless communication method is a method of performing cognitive wireless communication (communication between secondary users or connection of a communication line of the secondary user) in a wireless communication system having the same configuration as the wireless communication system according to the above-described first aspect of the invention.

According to other aspect of the invention, a program (algorithm) realizing the above-described wireless communication method is provided or a recording medium storing the program is provided. When the program (algorithm) is executed by the cluster head equipment (CHE), the above-described wireless communication method can be realized.

Advantageous Effects of Invention

According to the aspects of the invention, in the wireless communication system, the cluster head equipment (CHE) notifies the secondary user of information necessary for cognitive communication. Therefore, the interference can be avoided, even when the plurality of networks coexist. According to the aspects of the invention, in the wireless communication system, the secondary user does not need to access the coexistent database. Therefore, the information necessary to avoid the interference can easily be acquired without delay. According to the aspects of the invention, it is possible to provide the cluster head equipment (CHE) which can be installed in the conventional wireless communication system and the wireless communication method or the like used in the wireless communication system.

BRIEF DESCRIPTION OF DRAWINGS

FIG. 5 is a flowchart illustrating the order of processes performed by the cluster head equipment (CHE) in FIG. 1.

FIG. 6 is a diagram illustrating an example of cluster-unique information announced in step S20 of FIG. 5.

DESCRIPTION OF EMBODIMENTS

For example, the invention relates to a wireless communication system and a wireless communication method for which coexistence is possible even when a plurality of wireless communication terminals belong to different wireless networks. Specifically, the invention relates to a technology for sharing a white space (or a spectrum hole) between a plurality of wireless networks, when the wireless communication system includes the plurality of wireless networks including a cognitive wireless communication terminal which is a secondary user and the plurality of wireless networks are based on the same wireless access technology or different wireless access technologies. The use of a spectrum is promoted by the coexistence of the plurality of networks (that is, by sharing a white space).

According to the invention, an autonomous method is used so that the plurality of wireless networks coexist without interference. In the autonomous method, which is different from a centerized method, access to a database is not necessary. In the invention, it is possible to shorten or reduce a time necessary for sensing a primary signal.

Hereinafter, modes (embodiments) for carrying out the invention will be described with reference to the drawings. However, the embodiments to be described below are merely examples, and thus can be appropriately modified within the scope apparent to those skilled in the art.

Figure 1:
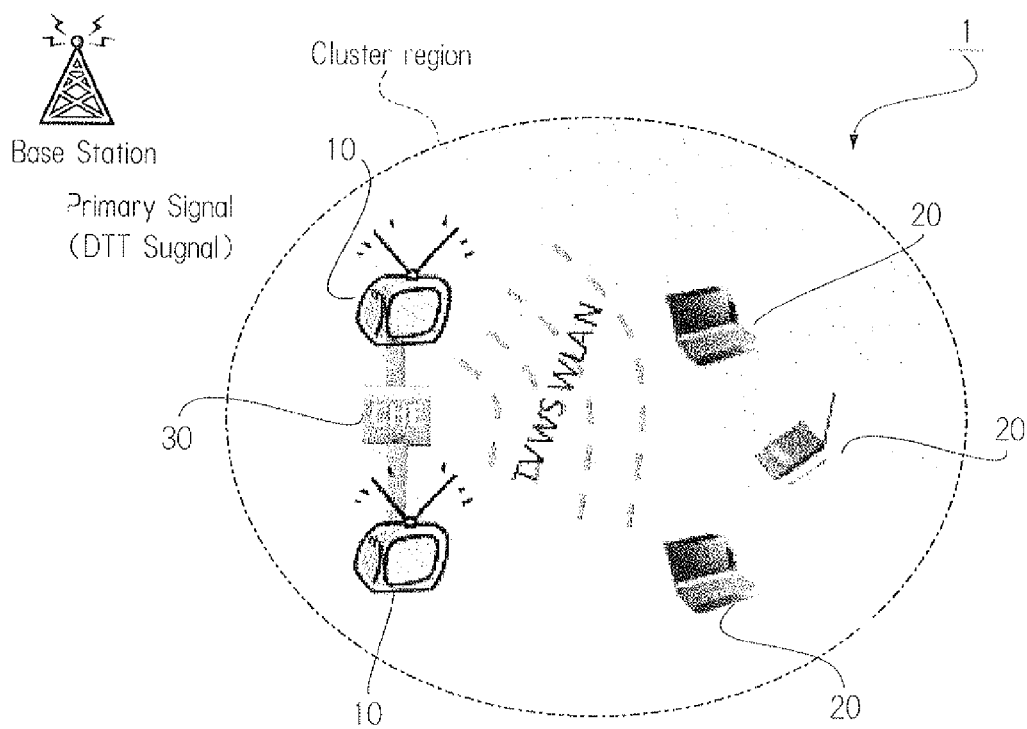
FIG. 1 is a schematic diagram illustrating the configuration of a wireless communication system according to an embodiment of the invention.

FIG. 1 is a schematic diagram illustrating the configuration of a wireless communication system according to the embodiments of the invention.

In a wireless communication system 1 illustrated in FIG. 1, at least one primary user 10 and a plurality of secondary users 20 are disposed within a predetermined region. The primary user 10 is, for example, a digital television set (DTV) and receives a primary signal (DTT signal) from a base station to display an image or output a sound. Here, the predetermined region refers to a limited region or space including the primary user 10. Specifically, the predetermined region refers to a relatively narrow space within the range of a predetermined radius (for example, within 20 m) from a cluster head equipment (CHE) to be described below. Hereinafter, a relatively narrow region or space is referred to as a cluster region. Within the cluster region, the plurality of secondary users 20 are configured to form a network in which cognitive wireless communication is performed. In this case, there is a probability that the wireless communication system 1 receives interference from a wireless network formed in another cluster region. Further, avoidance of the interference will be described later.

Accordingly, as illustrated in FIG. 1, a cluster head equipment (CHE) 30 is disposed in the wireless communication system 1. The cluster head equipment (CHE) 30 is an equipment that provides a wireless local area network (WLAN) to the cluster region. The cluster head equipment (CHE) 30 enables the plurality of secondary users 20 to perform cognitive wireless communication. In other words, the cluster head equipment (CHE) 30 is an equipment that controls the secondary users present within the corresponding cluster region. Further, each secondary user 20 performs the cognitive wireless communication with the cluster head equipment (CHE) 30 to access a communication line via the cluster head equipment (CHE) 30. Here, an example of the communication line is the Internet.

The cluster head equipment (CHE) 30 will be described in detail. The cluster head equipment (CHE) 30 is configured to include at least one of the functions to be described below.

First, the cluster head equipment (CHE) 30 has a function (unit) of acquiring information regarding the primary user 10. Therefore, the cluster head equipment (CHE) 30 is connected to the primary user 10 in a wired or wireless manner. The cluster head equipment (CHE) 30 is preferably mounted on the primary user 10. For example, the cluster head equipment (CHE) 30 may be mounted in a chip for the primary user 10. In this way, the above-described wireless communication system 1 can be easily configured. Moreover, the cluster head equipment (CHE) may not be mounted in the primary user. In this case, the cluster head equipment (CHE) 30 is installed near the primary user 10 (within the cluster region) and is connected to the primary user in a wired or wireless manner.

The cluster head equipment (CHE) 30 has a function of identifying whether the primary user 10 is turned off. When the plurality of primary users 10 are present, it is identified whether all of the primary users 10 are turned off. The cluster head equipment (CHE) 30 transmits information regarding a power source as information regarding the primary user 10 to each secondary user 20. In this case, each secondary user 20 can perform the cognitive wireless communication using a frequency band available by the primary user. The fact that a device using the primary signal is not present within the cluster region is used even when interference occurs in the primary signal within the cluster region in the cognitive wireless communication between the secondary users 20. That is, when the primary user 10 does not operate, all of the frequency bands (plurality of channels) corresponding to the primary signal are frequency bands (white spaces) which the secondary users 20 are able to use within the cluster region.

The cluster head equipment (CHE) 30 has a function of identifying whether the primary user 10 uses a predetermined channel among the plurality of available channels. The cluster head equipment (CHE) 30 transmits, to each secondary user 20, information indicating that the primary user 10 uses the predetermined channel or information regarding a channel which the primary user 10 does not use as the information regarding the primary user 10. In this case, the secondary user 20 can perform the cognitive wireless communication using a channel different from the channel used by the primary user 10. That is, the frequency bands or channels available to the secondary user 20 are all of the channels other than the channel used by the primary user 10 within the cluster region. In this way, by providing the cluster head equipment (CHE) 30 near the primary user 10 (within the cluster region), it is possible to easily acquire the information necessary to avoid the interference.

The cluster head equipment (CHE) 30 may not have both of the function of identifying whether the primary user 10 is turned off and the function of identifying whether the primary user 10 uses the predetermined channel, but may have one of these functions. The cluster head equipment (CHE) 30 preferably has both of these functions, and thus the secondary user 20 can understand the frequency band (channel) available by the secondary user 20 more accurately. Even when the cluster head equipment (CHE) 30 have both of these functions, all of the channels are available while the power is turned off. Therefore, it is not necessary to specify whether the primary user 10 uses the predetermined channel.

As described above, the cluster head equipment (CHE) 30 has the function of acquiring the information regarding the primary user 10. Therefore, the information regarding the frequency band available to the secondary user can be easily acquired as the information necessary to avoid the interference. Specifically, the cluster head equipment (CHE) 30 or the secondary user 20 does not need to access a coexistent database.

Second, the cluster head equipment (CHE) 30 has a function (unit) of acquiring information regarding the primary signal. As the information regarding the primary signal, information acquired by causing the cluster head equipment (CHE) 30 by itself to perform sensing the primary signal may be used. Alternatively, information acquired from the received sensing information indicating the result of the sensing performed by another device may be used. To acquire the sensing information, the cluster head equipment (CHE) 30 may access a predetermined storage unit (a memory of the cluster head equipment (CHE) or a database in the wireless communication system). Then, the cluster head equipment (CHE) 30 specifies a channel (vacant channel) determined in advance not to be used by the primary user 10 among the plurality of channels corresponding to the primary signal and transmits information regarding the vacant channel to the secondary user 20. In this case, the secondary user 20 can perform the cognitive wireless communication using the vacant channel.

As described above, the cluster head equipment (CHE) 30 has the function of acquiring the information regarding the primary signal. Therefore, even when the primary user 10 operates, the information regarding the frequency band available to the secondary user can be easily acquired as information necessary to avoid the interference.

Figure 7:
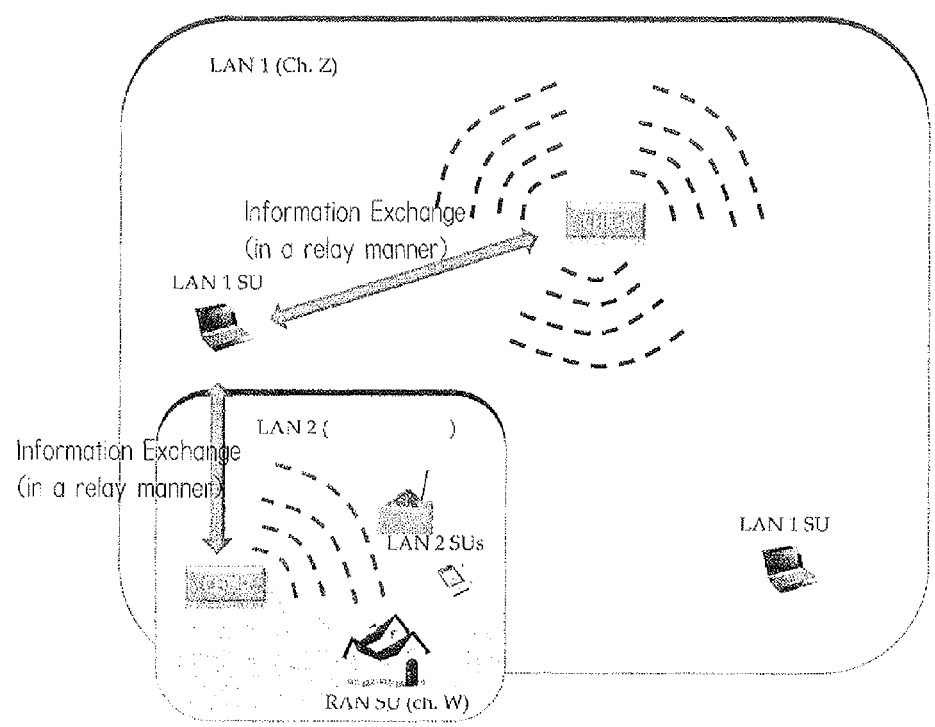
FIG. 7 is a diagram illustrating an example in which information is delivered in a relay manner through information exchange and an example in which information is delivered via the secondary user.

Third, the cluster head equipment (CHE) 30 has a function of exchanging information with a second cluster head equipment (CHE) installed in another cluster region. The cluster head equipment (CHE) 30 can acquire the information regarding the primary user present in another cluster region and the information regarding the secondary user through the information exchange. The information or the like obtained through the information exchange is also transmitted to the secondary user 20 present within the cluster region corresponding to the local area network (LAN) provided by the cluster head equipment (CHE) 30. The cluster head equipment (CHE) 30 preferably has a function of processing the acquired information and then generating control information for controlling each secondary user. An example of the control information includes information regarding a channel to be used by the secondary user and information regarding how to access a spectrum. When the secondary user has a capability of receiving and processing the information acquired by the acquiring unit of the cluster head equipment (CHE), the cluster head equipment (CHE) does not need to have the above-described function of generating the control information. The cluster region and another cluster region may overlap each other or may be spaced from each other. When the cluster region and another cluster region may overlap each other, the cluster head equipment (CHE) 30 also can perform the information exchange in a relay manner with the second cluster head equipment (CHE) via the secondary user 20 present within the cluster region (see FIG. 7).

Figure 8:
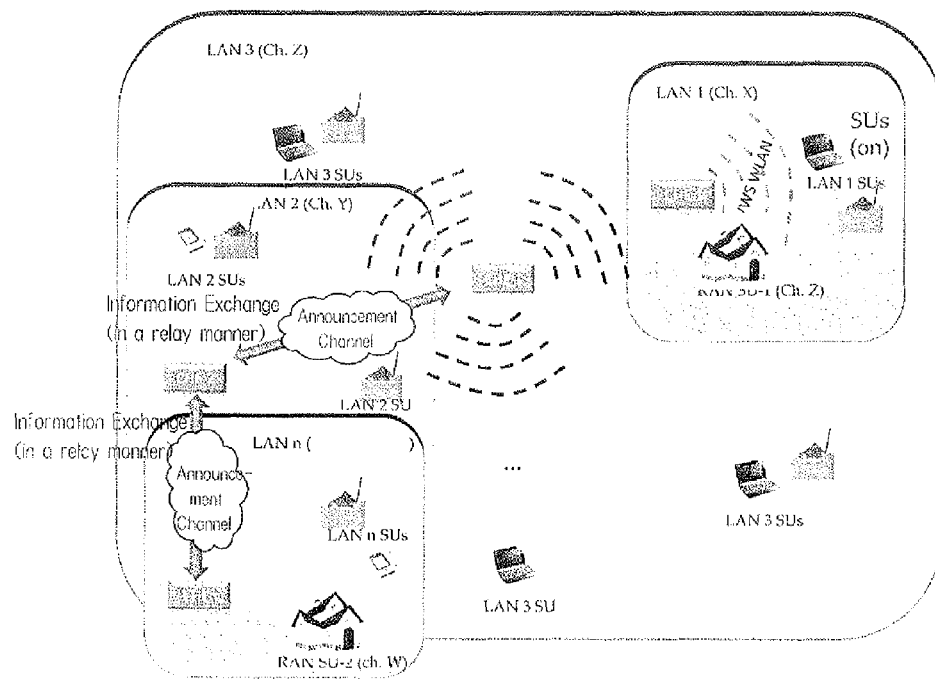
FIG. 8 is a diagram illustrating another example in which information is delivered in a relay manner through information exchange and an example in which information is delivered between the plurality of cluster head equipments (CHE).

The cluster head equipment (CHE) 30 more preferably performs information exchange with a third cluster head equipment (CHE) via the second cluster head equipment (CHE) Thus, the information regarding a remote cluster head equipment (CHE) can be acquired in the relay manner (see FIG. 8). In this case, the cluster head equipment (CHE) 30 can acquire information regarding the primary user present within the cluster region corresponding to the local area network (LAN) provided by the third cluster head equipment (CHE) and the information regarding the secondary user. The information acquired in this way is also transmitted to the secondary user 20 present within the cluster region corresponding to the local area network (LAN) provided by the cluster head equipment (CHE) 30. As a result, it is possible to perform control such that there is no interference to the network provided by the third cluster head equipment (CHE) and there is no interference from the network.

The above-described function of performing the information exchange is effective, when the wireless communication system 1 includes a plurality of cluster head equipments (CHE). Accordingly, the case in which the wireless communication system 1 includes a plurality of cluster head equipments (CHE) will be described in detail.

Figure 2:
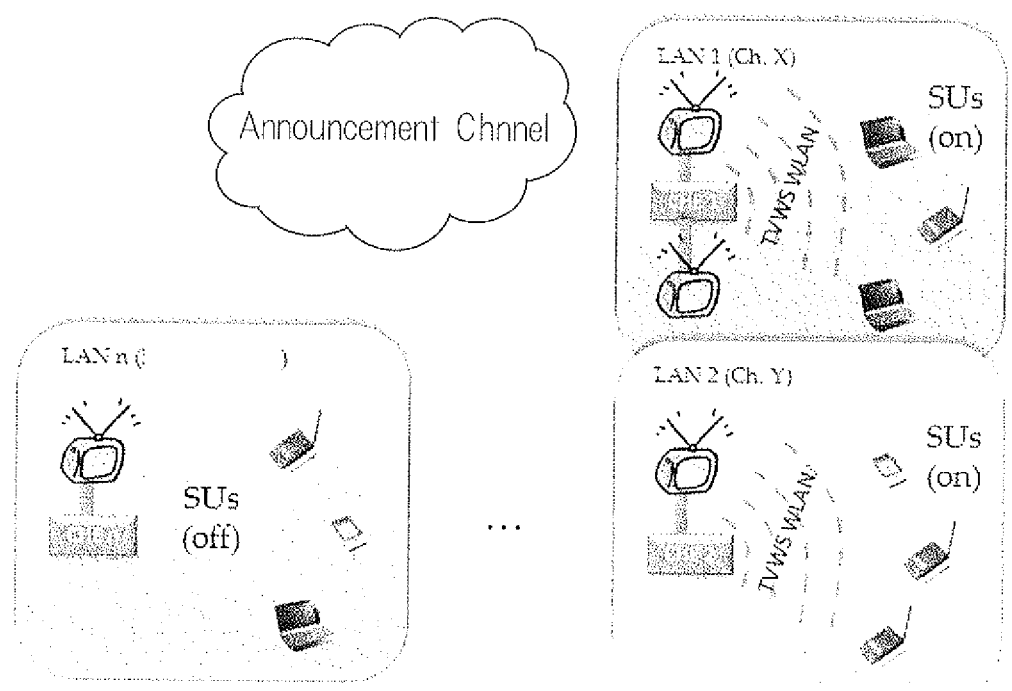
FIG. 2 is a diagram illustrating a case in which a plurality of wireless local area networks (WLAN) coexist, when the wireless communication system in FIG. 1 includes a plurality of cluster head equipments (CHE).
Figure 3:
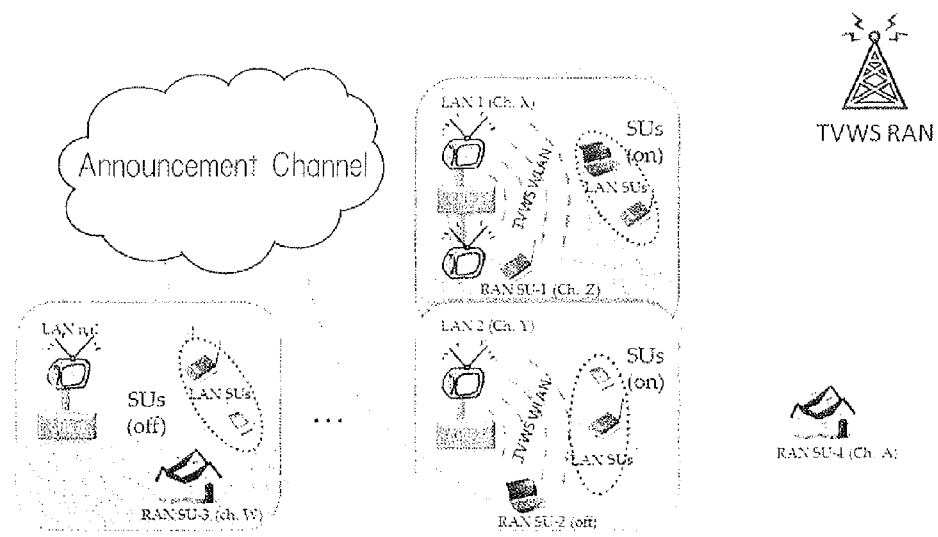
FIG. 3 is a diagram illustrating a case in which a terminal operating in a regional area network (RAN) is included in the case illustrated in FIG. 2, when the wireless communication system in FIG. 1 includes a plurality of cluster head equipments (CHE).

FIGS. 2 and 3 are diagrams illustrating the case in which the wireless communication system 1 in FIG. 1 includes a plurality of cluster head equipments (CHE) FIG. 2 is the diagram illustrating the case in which a plurality of wireless local area networks (WLAN) coexist. FIG. 3 is the diagram illustrating the case in which terminals operating in a regional area network (RAN) are included in the case illustrated in FIG. 2.

As illustrated in FIGS. 2 and 3, the wireless communication system 1 includes the plurality of cluster head equipments (CHE). Each cluster head equipment (CHE) is installed in one cluster region. That is, in the wireless communication system 1, the plurality of cluster head equipments (CHE) are distributed or dispersed. The plurality of cluster head equipments (CHE) are configured to perform information exchange via an announcement channel, as described above. Control is performed such that the wireless local area networks (WLAN) provided by the cluster head equipments (CHE) do not interfere with each other by using the information (the information regarding the primary user and the information regarding the secondary user) acquired through the information exchange.

FIG. 9 is a timing chart illustrating a process performed in the wireless communication system 1 illustrated in FIGS. 2 and 3 and a timing (frame) of the process.

The process performed in the wireless communication system 1 is broadly classified into two kinds of processes. One of the processes is preprocessing performed to realize coexistence of the plurality of networks and is performed within the time of a frame corresponding to a coexistence window illustrated in FIG. 4. The other process is processing actually performed in the cognitive wireless communication by the secondary user and is performed within the time of a frame corresponding to a time window for the secondary user illustrated in FIG. 4.

Specifically, with the frame corresponding to the coexistence window, each cluster head equipment (CHE) performs information exchange with another cluster head equipment (CHE). The information exchange will be described in detail below. Moreover, each cluster head equipment (CHE) specifies the frequency band available to the secondary user using the information obtained through the information exchange within the time of the frame corresponding to the coexistence window, and transmits the information to the corresponding secondary user.

Each cluster head equipment (CHE) adjusts an available frequency band depending on whether a given secondary user is to use a spectrum among the plurality of secondary users present within the corresponding cluster region within the time of the frame corresponding to the coexistence window. The cluster head equipment (CHE) performs sensing a primary signal from the base station within the time of the frame corresponding to the coexistence window.

With the frame corresponding to the time window for the secondary user, each secondary user transmits data (performs the cognitive wireless communication) based on the information received from the corresponding cluster head equipment (CHE).

Figure 4:
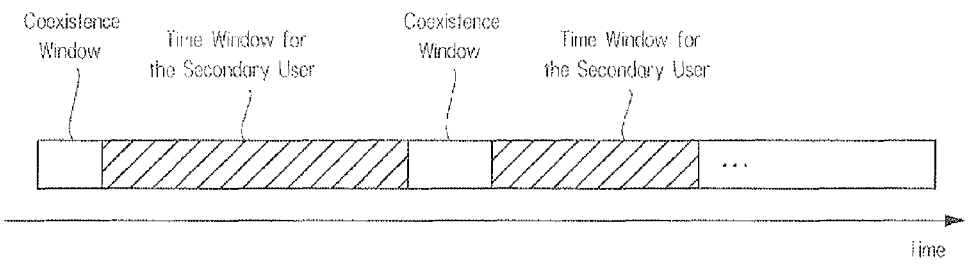
FIG. 4 is a timing chart illustrating a process performed in the wireless communication system illustrated in FIG. 2 or 3 and a timing (frame) of the process.

As illustrated in FIG. 4, a frame corresponding to a time window for a secondary user is subsequent to a frame corresponding to a coexistence window. Within the time of the frame, only the secondary user which does not have an influence of the interference on the primary user can performs the cognitive wireless communication (the communication between the secondary users or the connection of a communication line of the secondary user). Further, by disposing the frame corresponding to the coexistence window periodically, a secondary user's intention to use a spectrum can steadily be reflected. Therefore, since the use of the spectrum can be promoted, the spectrum can consequently be used with efficiency. Moreover, the cluster head equipment (CHE) 30 preferably changes and optimizes the time of the frame corresponding to the time window for the secondary user, for example, in accordance with the number of secondary users present in the corresponding cluster region.

FIG. 5 is a flowchart illustrating the order of the processes performed by the cluster head equipment (CHE) 30 in FIG. 1. A program (algorithm) corresponding to the process illustrated in FIG. 5 is stored in, for example, a recording medium. The process illustrated in FIG. 5 is realized by causing the cluster head equipment (CHE) 30 mainly to read the program from the recording medium and execute the program.

First, the processes of step S10 to step S70 illustrated in FIG. 5 are performed within the time of the frame corresponding to the above-described coexistence window by the cluster head equipment (CHE) 30. In step S10, the cluster head equipment (CHE) 30 specifies an announcement channel. The announcement channel is a channel that is used to exchange information regarding the sensing between the networks provided by the plurality of cluster head equipments (CHE) and is, for example, a dedicated control channel which the secondary user may not access. Moreover, the dedicated control channel may be a channel for wireless (for example, beacon) communication or may be a channel for wired communication. As the dedicated control channel, a channel having a concept similar to the concept of a cognitive pilot channel (CPC) can be exemplified. Thus, it is possible to prevent the primary user 10 from receiving the interference, when the information exchange is performed.

Subsequently, in step S20, the cluster head equipment (CHE) 30 notifies other cluster head equipments (CHE) of cluster-unique information such as the current spectrum use state using, for example, a beacon. As illustrated in FIG. 6, examples of the cluster-unique information include information regarding a frequency occupation state of the primary user or the second user, information regarding the geographical position (local position) of the secondary user (or the cluster head equipment (CHE)), information regarding a wireless transmitter of the secondary user, information regarding a channel model of the local position, information regarding an transmission output, and information regarding QoS (Quality of Service). The cluster-unique information preferably includes information (for example, information regarding a frequency band intended to be used) regarding the intention to use a spectrum.

In step S30, the cluster head equipment (CHE) 30 acquires the current spectrum use information (QoS, a service type, or the like) transmitted using the beacon from another cluster head equipment (CHE) near the cluster head equipment and the information (the transmission output, the local position, or the like) of the wireless transmitter of the cluster head equipment (CHE). That is, by performing the processes of step S20 to step S30, the information exchange is performed between the plurality of cluster head equipments (CHE). Thus, by acquiring the information or the like regarding the transmission outputs or the local positions of other cluster head equipments (CHE), it can be determined whether the cluster region of the cluster head equipment (CHE) 30 interferes with the other cluster regions (whether the cluster region is within an interference allowance range). For example, when two cluster regions overlap each other, there is a high probability that interference exceeding the interference allowance range (threshold value) occurs in both cluster regions. In general, when the transmission output is large, two cluster regions overlap each other. However, even when the transmission output is large, the interference may be within the allowance range in some cases due to the geographical shape or the like of the cluster region. Accordingly, it is preferably determined whether two cluster regions interfere with each other in consideration of both the information regarding the transmission output and the information regarding the position.

Subsequently, in step S40, the cluster head equipment (CHE) 30 determines a method (the sensing, the data transmission, and the like) of accessing a spectrum. Further, the sensing may be determined, as necessary. When the sensing is determined, the kind of sensing or the range of the sensing is determined. Accordingly, for example, a process relevant to the sensing can be simplified. The information determined in this way is generated as control information for controlling the secondary user. An example of the control information includes information for performing control such that the transmission output of the secondary user has a small value, when a specific frequency band specified by the secondary user present within each cluster region is used (without change). By using the control information, the interference can be prevented. Another example of the control information includes information for causing a time slot used for the secondary user located within one cluster region to perform communication to differ from a time slot used for the secondary user located within the different cluster region to perform the communication, when the secondary user present within each cluster region uses a specific frequency band (without change). More preferably, the control is performed such that the time slots are alternated.

Then, the cluster head equipment (CHE) 30 specifies an available spectrum opportunity in accordance with the access method determined in step S40 (step S50). When the cluster head equipment (CHE) 30 specifies the spectrum opportunity, the cluster head equipment (CHE) 30 may specify the spectrum opportunity by performing the sensing. Alternatively, when it is known that all of the primary users 10 present in the overlapping cluster regions in the wireless communication system 1 does not use a spectrum (for example, when the power is turned off or only a predetermined channel is used), the cluster head equipment (CHE) 30 specifies the unused spectrum as the spectrum opportunity.

When the spectrum opportunity is specified, the transmission output is preferably determined as well. For example, when it is determined that the transmission output has a sufficiently small value, the cluster region is narrowed and the overlapping portion with another cluster region is consequently narrowed. Accordingly, the interference does not occur, and thus the spectrum can efficiently be used.

Thereafter, in step S60, it is determined whether the spectrum opportunity can be used (step S60). For example, when the spectrum opportunity is specified but the spectrum opportunity is used in another cluster region in which there is a probability that the interference occurs, it is determined that the spectrum opportunity may not be used.

When it is determined that the spectrum opportunity can be used as the determination result of step S60 (Yes in step S60), the cluster head equipment (CHE) 30 first transmits information regarding the available spectrum to the secondary user or the like present within the cluster region (step S70). At this time, the transmitted information also includes information for suggesting reconfiguration (reconstruction) to the secondary user 20.

Thereafter, each secondary user performs wireless access (that is, the cognitive wireless communication) using a spectrum based on the information transmitted from the cluster head equipment (CHE) 30 (step S80). The process of step S80 is performed within a time period corresponding to the above-described time window for the secondary user.

Thereafter, it is determined whether the present process ends (step S90). When the present process does not end, the process returns to step S20 and the subsequent process is performed. Specifically, when the time of the frame corresponding to the subsequent coexistence window starts, the subsequent process starts. Conversely, when the present process ends (No in step S90), a necessary ending process is performed to complete all of the processes.

When it is determined that the spectrum opportunity may not be used as the determination result of step S60 (No in step S60), the processes of step S30 to step S60 are repeated until an available spectrum opportunity is specified.

According to the above-described embodiment, the cluster head equipment (CHE) 30 can acquire the information regarding the primary user and the information regarding another cluster region from another cluster head equipment (CHE) Here, the information regarding another cluster region includes information regarding the primary user and the information regarding the secondary user. The cluster head equipment (CHE) 30 preferably acquires the information regarding the secondary user within the corresponding cluster region. In this way, it is possible to prevent generation of the interference between the plurality of cluster regions (networks) from having an adverse influence on each other.

According to the above-described embodiment, the cluster head equipment (CHE) 30 does not need to perform sensing the primary signal at least on the frequency band or the channel used by the primary user 10. That is, the cluster head equipment (CHE) 30 does not need to scan all of the frequency bands or the channels, as in the related art. Accordingly, it is possible to shorten or reduce the time necessary to perform sensing the primary signal. As a result, it is possible to shorten the time taken to start the cognitive wireless communication. That is, the delay can be prevented. In this embodiment, some of the processes performed by the secondary user, a cognitive engine, or the like in the related art are performed by the cluster head equipment (CHE) 30 and the cluster head equipment (CHE) 30 acquires the information regarding the primary user 10 in advance. Thus, the processing time can be shortened.

According to the above-described embodiment, the cluster head equipment (CHE) 30 does not need to access a database such as the coexistent database. Therefore, it is possible to shorten the time necessary to access the database. In particular, even when a plurality of secondary users are present within a cluster region, it is possible to considerably shorten the time taken to start the cognitive wireless communication compared to the related art due to the fact that the access to the database is not necessary.

The above-described processes can be performed by each of the cluster head equipments (CHE) distributed or dispersed in the wireless communication system 1. Therefore, even when a secondary user belongs to any network, a plurality of secondary users can share the available spectrum (white space). That is, the plurality of networks can coexist. Thus, the spectrum use efficiency can be improved. The plurality of kinds of networks (for example, LAN or RAN) to which the secondary users can belong may be the same kind of network, as in FIG. 2 or may be different networks, as in FIG. 3.

As in the case illustrated in FIG. 3, the cluster head equipments (CHE) belong to a regional area network (RAN) in which a region including the cluster regions is set as a coverage area. In this case, the cluster head equipment (CHE) is configured to acquire one or both of the information regarding a user (another secondary user) belonging to the regional area network (RAN) and the information regarding the signal supplied to the regional area network (RAN). The cluster head equipment (CHE) is configured to transmit the acquired information in this way to the secondary user as well. Thus, even when a user (another secondary user) belonging to the regional area network (RAN) is present within the cluster region, it is possible to avoid the interference to the regional area network (RAN) as well.

According to the embodiment, the secondary user can acquire the information regarding the position of the primary user from the cluster head equipment (CHE). Therefore, the secondary user can improve the transmission output, when transmitting a signal toward an adjacent channel. Specifically, the transmission output can be reliably improved, compared to a case in which the transmission output is estimated in the worst scenario.

According to the above-described embodiment, the cluster head equipment (CHE) 30 may function as a database in which information regarding a protocol, basic regulation information, a policy, and a coexistence method is stored or may be used to transmit (transfer) information regarding the corresponding cluster region to another database (for example, a coexistent database). Thus, information update or information management can be promoted.

According to the above-described embodiment, it is preferable to perform mapping of a white space based on the spectrum use state or position of the primary user. The mapping is performed by, for example, the cluster head equipment (CHE) Thus, for example, the mapping can be performed in very detail, compared to the mapping of the white space based on information (information regarding whether the primary signal is present) from a base station. More preferably, mapped information is stored along with information regarding a time and the cognitive wireless communication is controlled based on the information regarding the mapping varying over time.

Hereinafter, embodiments (first and second embodiments) of the invention will be described.

First Embodiment

A first embodiment of the invention corresponds to a case in which the invention is realized in a television white space. As illustrated in FIG. 2, local area networks (LAN) are configured to coexist.

In this embodiment, as a scenario, a case will be considered in which a network formed by a base station (hereinafter, referred to as a primary broadcaster) for a primary user share the same area together with a plurality of networks (hereinafter, referred to as secondary cognitive networks) including a cognitive wireless communication terminal as a secondary user.

As illustrated in FIG. 2, the primary user is a digital television set (DTV). The plurality of primary users are disposed within an area. The digital television set (DTV) is a communication device that is configured to receive a DTT signal (primary signal) transmitted from the primary broadcaster.

A network (hereinafter, referred to as a secondary network) in which the secondary user can use the cognitive wireless communication is a local area network (LAN) in this embodiment.

That is, in the first embodiment, the wireless communication system includes a plurality of local area networks (LAN). The plurality of local area networks (LAN) each includes a digital television set (DTV) as a primary user, a cluster head equipment (CHE), and a plurality of cognitive wireless communication terminals as secondary users. The secondary network is configured such that the plurality of cognitive wireless communication terminals can share available spectrum, when it is confirmed that there is no primary signal (that is, information is delivered from the cluster head equipment (CHE) to the cognitive wireless communication terminal). Moreover, in the secondary network, when it is confirmed that there is no primary signal, the cognitive wireless communication between the cognitive wireless communication terminals and the cluster head equipment (CHE) is performed using the available spectrum, and the cognitive wireless communication terminals can be connected to the communication line such as the Internet via the cluster head equipment (CHE).

The plurality of cluster head equipments (CHE) distributed in the cluster regions (that is, the region in which the local area networks (LAN) is formed) can each perform the wireless communication with the cognitive wireless communication terminals within the cluster region. Even when a regional area network (RAN) type cognitive wireless communication terminal is present within the cluster region, the cluster head equipment (CHE) can perform the wireless communication. The plurality of cluster head equipments (CHE) can perform the wireless communication with each other via an announcement channel. When the announcement channel is not available or there is no announcement channel, the plurality of cluster head equipments (CHE) are configured to use a channel or the like available by the digital television set (DTV).

In FIG. 2, it is assumed that a first cluster head equipment (CHE1) provides a first network (LAN1) and is first set up in the first network (LAN1) in an initialized state. In the first embodiment, the first cluster head equipment (CHE1) performs information exchange with the other cluster head equipments (CHE), acquires information regarding the primary users (the digital television sets (DTV)) within the other cluster regions and information regarding the secondary users (the cognitive wireless communication terminals), and then confirms that no primary signal (DTT signal) is present.

Here, a case will be considered in which the power of the digital television set (DTV) connected to the first cluster head equipment (CHE1) is shut oft (case in which the power is turned off).

In this case, since the first cluster head equipment (CHE1) is connected to the digital television sets (DTV), the first cluster head equipment (CHE1) can understand that the digital television sets (DTV) present within the cluster head region are not adjusted (tuned) to any frequency. Then, the first cluster head equipment (CHE1) notifies other cluster head equipments (CHE) (for example, the second to n-th cluster head equipments) of the information (the information regarding the primary user and the information regarding the secondary user). Likewise, the first cluster head equipment (CHE1) receives information regarding use of the digital television sets (DTV) present within the other cluster regions and information regarding the cognitive wireless communication terminals from the other distributed cluster head equipments (CHE) via an announcement channel. Thus, the information is shared between the plurality of cluster head equipments (CHE). Specifically, the first cluster head equipment (CHET) acquires information regarding the channel to which the primary user is tuned and information regarding a channel used by the secondary user within the cluster region in the other cluster regions. For example, the first cluster head equipment (CHE1) acquires information regarding a channel to which the primary user is adjusted and information (Ch. Y) regarding a channel used by the secondary user in the second cluster region from the second cluster head equipment (CHE2).

The first cluster head equipment (CHE1) understands the spectrum use states of the primary user and the secondary users present within the other cluster regions, and then confirms only whether a channel not available in the other cluster regions is available. Thus, since it is not necessary to perform sensing all of the frequencies of the spectrum, the load of the sensing is reduced. The first cluster head equipment (CHE1) can specify the cognitive wireless communication terminal that does not receive or give the interference from or to the other cluster regions. Thus, the cognitive wireless communication terminal can be allowed to perform wireless access.

The cluster head equipment (CHE) can estimate whether each secondary user is present within an interference area by acquiring information regarding the position of each secondary user. Here, the interference area refers to an area in which the cluster regions overlap each other. The cluster head equipment (CHE) controls the secondary user estimated to be present within the interference area such that an available frequency band or the like is limited or changed or the transmission output is reduced. Thus, the interference can be prevented.

In the above-described embodiment, the secondary user may be configured to determine by itself whether the secondary user is present within the interference area. In this case, the secondary user transmits information regarding whether the secondary user is present within the interference area to the cluster head equipment (CHE) within the cluster region. The cluster head equipment (CHE) controls the secondary user present within the interference area such that an available frequency band or the like is limited or changed or the transmission output is reduced. Thus, the interference can also be prevented.

According to this embodiment, as described above, the plurality of secondary networks can coexist. Specifically, at least, the interference with the primary user does not occur and the primary user is reliably protected. According to the scheme of this embodiment, it is possible to reduce the interference between the secondary users, promote the use of the spectrum, and shorten the time necessary to perform sensing the primary signal.

Next, a case will be considered in which the digital television set (DTV) connected to the first cluster head equipment (CHE1) is funned to a predetermined channel (Ch-X).

Even in this case, a process is performed as in the above-described case. However, the first cluster head equipment (CHE1) further shortens the time required to perform sensing the primary signal. This is because the first cluster head equipment (CHE1) understands which channel (Ch. X) is used by the connected DTV. That is, the first cluster head equipment (CHE1) excludes the channel (Ch. X) from the candidates of the channels available by the secondary user and does not perform sensing the channel.

The first cluster head equipment (CHE1) announces the information regarding the use of the spectrum via the announcement channel. When the information is used, the cluster head equipments (CHE) present within the other cluster regions can also shorten the time necessary to perform sensing the primary signal. This is because sensing the channel (Ch. X) is not performed so as not to cause the interference with the primary user within the first cluster region (LAN1).

In the first embodiment, the interference is accordingly configured not to occur regardless of whether or not the primary user operates. When the primary user operates, it is possible to further shorten the time necessary to perform sensing the primary signal.

A case in which the secondary network is a wireless regional area network (RAN) will be described in a second embodiment. That is, in the first embodiment, the cognitive wireless communication terminal does not communicate with a cognitive wireless communication terminal in a regional area network (RAN). In the first embodiment, a regional area network (RAN) type cognitive wireless communication terminal is configured not to communicate with a cognitive wireless communication terminal in a local area network (LAN). Moreover, a case will not be described in which the secondary network is a local area network (LAN) type and regional area network (RAN) type.

Second Embodiment

The second embodiment of the invention relates to a scenario in which a local area network (LAN) and a regional area network (RAN) coexist. Here, as illustrated in FIG. 3, the regional area network (RAN) includes a base station and a plurality of cognitive wireless communication terminals.

An area covered by the regional area network (RAN) is generally very broad. In other words, in a coverage area of the regional area network (RAN), abundant cognitive wireless communication terminals belonging to the regional area network (RAN) operate under the control of corresponding base stations. Therefore, when the coverage area of the regional area network (RAN) overlaps the coverage area (cluster region) of a local area network (LAN), all of the spectra are needed to be considered to be used in the regional area network (RAN).

Accordingly, when the coverage area of the regional area network (RAN) overlaps the coverage area of a local area network (LAN), there is a high probability that available spectra scarcely remain in the local area network (LAN). Therefore, it is not realistic that a cluster head equipment (CINE) searches for a channel not used in the regional area network (RAN) and cognitive wireless communication terminals realize wireless access only based on the searched channel. Even though this case is realized, the use of the spectrum in the local area network (LAN) considerably decreases.

Accordingly, in the second embodiment, when the cognitive wireless communication terminal in the regional area network (RAN) is present in the coverage area of the local area network (LAN), the cognitive wireless communication terminal notifies the cluster head equipment (CHE) of the spectrum use state. Then, the cluster head equipment (CHE) provides the wireless access to the cognitive wireless communication terminal in the local area network (LAN) via a channel different from the channel used by the regional area network (RAN) type cognitive wireless communication terminal. Thus, the spectrum use of the local area network (LAN) can be promoted, and the local area network (LAN) and the regional area network (RAN) can be allowed to coexist.

The features of the invention will be emphasized. In the invention, information indicating that a secondary signal is present does not serve as a determination criteria for determining some of the spectra scheduled to be used in a local area network (LAN). Information regarding the presence of a cognitive wireless communication terminal as a secondary user and information regarding the spectrum use thereof serve as main determination criteria. Thus, when a cognitive wireless communication terminal belonging to the regional area network (RAN) is not present within the coverage area of the local area network (LAN), all of the spectra can be used in the local area network (LAN) in spite of the fact that the secondary signal from a base station of the regional area network (RAN) is present. This is because a cognitive wireless communication terminal receiving the interference in the regional area network (RAN) is not present.

Even when a cognitive wireless communication terminal belonging to the regional area network (RAN) is present within the coverage area of the local area network (LAN), some of the spectra not used by a wireless receiver of a secondary user belonging to the regional area network (RAN) can be used in the local area network (LAN) irrespective of whether a secondary signal is present within the coverage area of the local area network (LAN) by causing the cluster head equipment (CHE) to understand the spectrum use state of the above-described cognitive wireless communication terminal in the invention.

INDUSTRIAL APPLICABILITY

The invention is applicable to a wireless communication system and a wireless communication method. In particular, the invention is preferably applicable to a system defined in conformity with IEEE 802.22 or IEEE 802.11af.

The invention claimed is:

1. A wireless communication system that is capable of performing cognitive wireless communication, comprising:
a primary user that is able to receive a primary signal which is a wireless signal from a base station;
a cluster head equipment (CHE) that provides a local area network (LAN) to a predetermined cluster region including the primary user; and
a secondary user that is present within the cluster region, wherein the cluster head equipment (CHE) includes
n acquiring unit that acquires one or both of information regarding the primary user and information regarding the primary signal, and
a transmitting unit that transmits information to the secondary user, and
wherein based on the information received from the transmitting unit of the cluster head equipment (CHE), the secondary user performs the cognitive wireless communication with another secondary user or performs the cognitive wireless communication with the cluster head equipment (CHE) to connect to a communication line via the cluster head equipment (CHE),
wherein the acquiring unit of the cluster head equipment (CHE) acquires the information regarding the primary user by specifying whether the primary user is turned off, and
wherein the secondary user performs the cognitive wireless communication using a frequency band available by the primary user, when the secondary user receives information indicating that the primary user is turned off from the cluster head equipment (CHE).

2. The wireless communication system according to claim 1,
wherein the cluster head equipment (CHE) further includes a generating unit that generates control information used to control the secondary user based on the information acquired by the acquiring unit, and
wherein the transmitting unit transmits the control information to the secondary user.

3. The wireless communication system according to claim 1,
wherein the acquiring unit of the cluster head equipment (CHE) acquires the information regarding the primary user by specifying whether the primary user uses a predetermined channel, and wherein the secondary user performs the cognitive wireless communication using a channel different from the channel used by the primary user, when the secondary user receives, from the cluster head equipment (CHE), information indicating that the primary user uses the predetermined channel or information regarding a channel which the primary user does not use.

4. The wireless communication system according to claim 1,
wherein the acquiring unit of the cluster head equipment (CHE) acquires the information regarding the primary signal by performing sensing the primary signal or based on sensing information indicating a sensing result of another device, and
wherein the secondary user performs the cognitive wireless communication using a vacant channel predetermined not to be used by the primary user among a plurality of channels corresponding to the primary signal, when the secondary user receives information regarding the vacant channel from the cluster head equipment (CHE).

5. The wireless communication system according to claim 1, further comprising:
a second cluster head equipment (CHE) that is installed in a cluster region different from the cluster region,
wherein the cluster head equipment (CHE) and the second cluster head equipment (CHE) perform information exchange, and therefore the acquiring unit of the cluster head equipment (CHE) acquires, from the second cluster head equipment (CHE), information regarding the primary user near the second cluster head equipment (CHE) and information regarding the secondary user belonging to a local area network (LAN) provided by the second cluster head equipment (CHE).

6. The wireless communication system according to claim 5, wherein the cluster head equipment (CHE) performs information exchange with a third cluster head equipment (CHE) via the second cluster head equipment (CHE), and thus the acquiring unit of the cluster head equipment (CHE) acquires, from the third cluster head equipment (CHE), information regarding the primary user near the third cluster head equipment (CHE) and information regarding the secondary user belonging to a local area network (LAN) provided by the third cluster head equipment (CHE).

7. The wireless communication system according to claim 5 or 6,
wherein the cluster head equipment (CHE) and the second cluster head equipment (CHE) perform information exchange using a dedicated control channel.

8. The wireless communication system according to claim 5 or 6,
wherein the acquiring unit of the cluster head equipment (CHE) specifies a frequency band available by the secondary user based on the information obtained through the information exchange, and
wherein the transmitting unit of the cluster head equipment (CHE) transmits the information specified by the acquiring unit to the secondary user.

9. The wireless communication system according to claim 8,
wherein the acquiring unit of the cluster head equipment (CHE)
acquires information regarding the different cluster region of the second cluster head equipment (CHE) through the information exchange,
specifies whether the local area network (LAN) provided by the cluster head equipment (CHE) interferes with the local area network (LAN) provided by the second cluster head equipment (CHE), and
sets a frequency band within which the two local area networks (LAN) do not interfere with each other as a frequency band available by the secondary user.

10. The wireless communication system according to claim 5,
wherein the secondary user includes
a determining unit that determines whether the secondary user is present within an interference area in which the local area network (LAN) provided by the cluster head equipment (CHE) interferes with the local area network (LAN) provided by the second cluster head equipment (CHE), and
a transmitting unit that transmits, to the cluster head equipment (CHE), information indicating that the secondary user is present within the interference area, when the secondary user is present within the interference area as the determination result of the determining unit, and
wherein the cluster head equipment (CHE) includes a control unit that controls the secondary user based on the information received from the transmitting unit of the secondary user.

11. The wireless communication system according to claim 1,
wherein the cluster head equipment (CHE)
belongs to a regional area network (RAN) including the cluster region, and
further includes a second acquiring unit that acquires one or both of information regarding a user belonging to the regional area network (RAN) and information regarding a signal supplied to the regional area network (RAN), and
wherein the transmitting unit of the cluster head equipment (CHE) transmits the information acquired by the second acquiring unit to the secondary user.

12. The wireless communication system according to claim 1,
wherein the cluster head equipment (CHE) is mounted on the primary user.

13. The wireless communication system according to claim 1,
wherein the cluster head equipment (CHE) notifies other cluster head equipment (CHE) of cluster-unique information using a beacon, the cluster-unique information comprising information regarding a frequency occupation state of the primary user or the second user, information regarding the geographical position (local position) of the secondary user (or the cluster head equipment (CHE)), information regarding a wireless transmitter of the secondary user, information regarding a channel model of the local position, information regarding a transmission output, and information regarding Quality of Service.

* * * * *